United States Patent
Matsumoto et al.

(10) Patent No.: US 12,139,780 B2
(45) Date of Patent: Nov. 12, 2024

(54) HOT-ROLLED STEEL SHEET FOR ELECTRIC RESISTANCE WELDED STEEL PIPE AND METHOD FOR MANUFACTURING THE SAME, ELECTRIC RESISTANCE WELDED STEEL PIPE AND METHOD FOR MANUFACTURING THE SAME, LINE PIPE, AND BUILDING STRUCTURE

(71) Applicant: JFE Steel Corporation, Tokyo (JP)

(72) Inventors: Akihide Matsumoto, Tokyo (JP); Atsushi Matsumoto, Tokyo (JP); Shinsuke Ide, Tokyo (JP); Takatoshi Okabe, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 328 days.

(21) Appl. No.: 17/776,326

(22) PCT Filed: Nov. 10, 2020

(86) PCT No.: PCT/JP2020/041808
§ 371 (c)(1),
(2) Date: May 12, 2022

(87) PCT Pub. No.: WO2021/100534
PCT Pub. Date: May 27, 2021

(65) Prior Publication Data
US 2022/0396856 A1    Dec. 15, 2022

(30) Foreign Application Priority Data

Nov. 20, 2019 (JP) ................................. 2019-209233

(51) Int. Cl.
*C22C 38/32* (2006.01)
*C21D 6/00* (2006.01)
(Continued)

(52) U.S. Cl.
CPC .............. *C22C 38/32* (2013.01); *C21D 6/005* (2013.01); *C21D 6/008* (2013.01); *C21D 8/0226* (2013.01);
(Continued)

(58) Field of Classification Search
None
See application file for complete search history.

(56) References Cited

U.S. PATENT DOCUMENTS

2006/0073352 A1* 4/2006 Amaya ................... C22C 38/04
428/544
2013/0000790 A1* 1/2013 Arai ....................... C21D 8/105
148/333

(Continued)

FOREIGN PATENT DOCUMENTS

CN    105102662 A    11/2015
EP    2799575 A1    11/2014
(Continued)

OTHER PUBLICATIONS

Taiwan Office Action with Search Report for Taiwan Application No. 109140237, dated Jun. 11, 2021, 9 pages.
(Continued)

*Primary Examiner* — Seth Dumbris
(74) *Attorney, Agent, or Firm* — Buchanan Ingersoll & Rooney PC

(57) ABSTRACT

Provided are a hot-rolled steel sheet for an electric resistance welded steel pipe and a method for manufacturing the same, an electric resistance welded steel pipe and a method for manufacturing the same, a line pipe, and a building structure. The hot-rolled steel sheet has a chemical composition containing, by mass %, C: 0.030% or more and 0.20% or less, Si: 0.02% or more and 1.0% or less, Mn: 0.40% or more and 3.0% or less, P: 0.050% or less, S: 0.020% or less, N:
(Continued)

0.0070% or more and 0.10% or less, and Al: 0.005% or more and 0.080% or less, the balance being Fe and incidental impurities, in which N dissolved in steel is contained in an amount of 0.0010% or more and 0.090% or less, and letting a sheet thickness be t, a steel microstructure at a ½t position has an average grain size of 20.0 μm or less.

16 Claims, 1 Drawing Sheet

(51) Int. Cl.

| | | |
|---|---|---|
| *C21D 8/02* | (2006.01) | |
| *C21D 8/10* | (2006.01) | |
| *C21D 9/08* | (2006.01) | |
| *C21D 9/46* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/08* | (2006.01) | |
| *C22C 38/20* | (2006.01) | |
| *C22C 38/22* | (2006.01) | |
| *C22C 38/24* | (2006.01) | |
| *C22C 38/26* | (2006.01) | |
| *C22C 38/28* | (2006.01) | |
| *F16L 9/02* | (2006.01) | |
| *F16L 9/17* | (2006.01) | |

(52) U.S. Cl.
CPC ........... *C21D 8/0263* (2013.01); *C21D 8/105* (2013.01); *C21D 9/08* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/20* (2013.01); *C22C 38/22* (2013.01); *C22C 38/24* (2013.01); *C22C 38/26* (2013.01); *C22C 38/28* (2013.01); *F16L 9/02* (2013.01); *F16L 9/17* (2013.01); *C21D 2211/002* (2013.01)

(56) References Cited

U.S. PATENT DOCUMENTS

| | | | |
|---|---|---|---|
| 2014/0352852 A1 | 12/2014 | Nakata et al. | |
| 2015/0376730 A1* | 12/2015 | Shuto | C22C 38/38 148/333 |
| 2016/0002745 A1 | 1/2016 | Kajihara | |
| 2016/0153063 A1* | 6/2016 | Goto | C21D 9/505 148/602 |
| 2017/0356071 A1* | 12/2017 | Toyoda | B21C 51/00 |
| 2019/0062862 A1 | 2/2019 | Nakata et al. | |

FOREIGN PATENT DOCUMENTS

| | | |
|---|---|---|
| EP | 2987887 A1 | 2/2016 |
| EP | 3138936 A1 | 3/2017 |
| EP | 3409803 A1 | 12/2018 |
| EP | 3476960 A1 | 5/2019 |
| EP | 3608434 A1 | 2/2020 |
| JP | 2001303196 A | 10/2001 |
| JP | 5293903 B1 | 9/2013 |
| TW | 201506171 A | 2/2015 |
| TW | 201546296 A | 12/2015 |
| WO | 2013099192 A1 | 7/2013 |
| WO | 2016056216 A1 | 4/2016 |
| WO | 2017130875 A1 | 8/2017 |
| WO | 2018235244 A1 | 12/2018 |

OTHER PUBLICATIONS

Extended European Search Report for European Application No. 20 891 044.8, dated Aug. 19, 2022, 9 pages.
Chinese Office Action with Search Report for Chinese Application No. 202080078928.5, dated Jan. 18, 2023, 8 pages.
International Search Report and Written Opinion for International Application No. PCT/JP2020/041808, dated Jan. 19, 2021, 5 pages.
Korean Office Action dated Jun. 15, 2024, for Korean Application No. 10-2022-7016029 with Concise Statement of Relevance of Office Action. (6 pages).

* cited by examiner

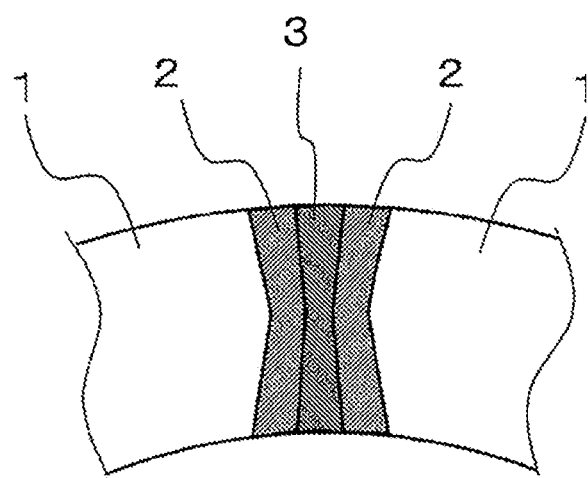

HOT-ROLLED STEEL SHEET FOR ELECTRIC RESISTANCE WELDED STEEL PIPE AND METHOD FOR MANUFACTURING THE SAME, ELECTRIC RESISTANCE WELDED STEEL PIPE AND METHOD FOR MANUFACTURING THE SAME, LINE PIPE, AND BUILDING STRUCTURE

CROSS REFERENCE TO RELATED APPLICATIONS

This is the U.S. National Phase application of PCT/JP2020/041808, filed Nov. 10, 2020 which claims priority to Japanese Patent Application No. 2019-209233, filed Nov. 20, 2019, the disclosures of these applications being incorporated herein by reference in their entireties for all purposes.

FIELD OF THE INVENTION

The present invention relates to a hot-rolled steel sheet for electric resistance welded steel pipes, the hot-rolled steel sheet having excellent toughness, high strength, and a low yield ratio and being suitably used as a material for large structures, such as line pipes and columns for buildings, and a method for manufacturing the hot-rolled steel sheet. The present invention relates to a thick-walled electric resistance welded steel pipe that has excellent toughness, high strength, and low yield ratio and that is suitably used for large structures, such as line pipes and columns for buildings, and a method for manufacturing the thick-walled electric resistance welded steel pipe. The present invention also relates to a line pipe and a building structure including the above-mentioned electric resistance welded steel pipe.

BACKGROUND OF THE INVENTION

An electric resistance welded steel pipe is manufactured by continuously uncoiling and feeding a hot-rolled and coiled steel sheet (steel strip), subjecting the hot-rolled steel sheet to cold roll forming into an open cylindrical pipe, performing electric resistance welding in which butt portions at both circumferential ends of the open pipe are melted by high-frequency electric resistance heating and pressure welding is performed by upsetting with squeeze rolls, and reducing the diameter to a predetermined outside diameter with sizing rolls.

As described above, the electric resistance welded steel pipe is continuously produced in the cold forming process and thus has the advantages, such as high productivity and high shape accuracy. However, the electric resistance welded steel pipe is work-hardened during the pipe production process and thus has a higher yield ratio of the pipe in the longitudinal direction than the hot-rolled steel sheet used as the material of the electric resistance welded steel pipe, disadvantageously resulting in low deformability of the pipe, for example, in bending deformation.

A thicker-walled electric resistance welded steel pipe results in greater work hardening during the pipe production process, resulting in a higher yield ratio after pipe production. It has thus been difficult to use a thick-walled electric resistance welded steel pipe for large structures, such as line pipes and columns for buildings, which are required to have low yield ratios in view of earthquake resistance.

For example, Patent Literature 1 describes a thick-walled electric resistance welded steel pipe in which the metal microstructure of the base steel sheet contains 50% to 92% polygonal ferrite in terms of area fraction, the above polygonal ferrite has an average grain size of 15 µm or less, the electric resistance welded portion has a hardness Hv of 160 to 240, and the microstructure of the above electric resistance welded portion consists of bainite, fine grain ferrite, and pearlite, or fine grain ferrite and bainite.

PATENT LITERATURE

PTL 1: Japanese Patent No. 5293903

SUMMARY OF THE INVENTION

However, the electric resistance welded steel pipe described in Patent Literature 1 cannot achieve both the strength and toughness required for line pipes and building structures because the base steel sheet contained 50% to 92% polygonal ferrite in terms of area fraction. In addition, for a thick-walled electric resistance welded steel pipes having a wall thickness of more than 17 mm, a required low yield ratio cannot be obtained because of the insufficient work hardening ability of ferrite.

When electric resistance welded steel pipes are used for line pipes, they are required to have the strength to withstand the internal pressure of a transported fluid and the toughness to stop crack propagation at the time of crack formation. When electric resistance welded steel pipes are used as columns for buildings, they need to have the strength and toughness to withstand the bending and impact forces that occur during earthquakes. For this reason, it is required to have a high strength of 450 MPa or higher in terms of yield strength and a toughness of –60° C. or lower in terms of the ductile-to-brittle transition temperature in a Charpy impact test for a hot-rolled steel sheet, or a toughness of –40° C. or lower in terms of the ductile-to-brittle transition temperature in the Charpy impact test for the base steel portion of an electric resistance welded steel pipe.

Aspects of the present invention have been made in light of the above-mentioned problems and aims to provide a hot-rolled steel sheet for electric resistance welded steel pipes, the hot-rolled steel sheet having excellent toughness, high strength, and a low yield ratio and being suitably used as a material for large structures, such as line pipes and columns for buildings, a method for manufacturing the hot-rolled steel sheet, a thick-walled electric resistance welded steel pipe, and a method for manufacturing the thick-walled electric resistance welded steel pipe. Aspects of the present invention also aim to provide a line pipe and a building structure including the above-mentioned electric resistance welded steel pipe.

The term "excellent toughness" used in accordance with aspects of the present invention indicates that the ductile-to-brittle transition temperature of a hot-rolled steel sheet in a Charpy impact test conducted by a method described in Examples below is –60° C. or lower, and that the ductile-to-brittle transition temperature of the base steel portion of an electric resistance welded steel pipe in the Charpy impact test conducted by the method described in Examples below is –40° C. or lower.

The term "high strength" used in accordance with aspects of the present invention indicates that the yield strength (YS) of each of a hot-rolled steel sheet and the base steel portion of an electric resistance welded steel pipe is 450 MPa or more, the yield strength being determined by a method described in Examples below.

The term "low yield ratio (low in yield ratio)" used in accordance with aspects of the present invention indicates that the yield ratio ($YR_P$) (%), represented by equation (1), of the hot-rolled steel sheet corresponding to that after pipe production is 90.0% or less. The yield ratio (YR) of the base steel portion of the electric resistance welded steel pipe (=(yield strength of the base steel portion of the electric resistance welded steel pipe/tensile strength of the base steel portion of the electric resistance welded steel pipe)×100) (%) is 90.0% or less.

$$YR_P=(4.0FS/TS)\times 100 \qquad \text{equation (1)}$$

In equation (1), "4.0FS" is the flow stress (MPa) at a nominal strain of 4.0%, and TS is the tensile strength (MPa) of the hot-rolled steel sheet.

The yield strength and tensile strength of each of the hot-rolled steel sheet and the electric resistance welded steel pipe were determined by methods described in Examples below. In accordance with aspects of the present invention, the nominal strain is the value obtained by dividing the displacement of the gauge length of the parallel section of a test specimen measured with an extensometer in a tensile test by the gauge length before the tensile test and then multiplying the resulting value by 100.

The term "thick-walled" indicates that the sheet thickness of the above hot-rolled steel sheet and the wall thickness of the base steel portion of the electric resistance welded steel pipe are more than 17 mm and 30 mm or less.

The inventors have conducted intensive studies to solve the above problems.

Typically, an electric resistance welded steel pipe contains C (carbon), as an interstitial solute element, in an amount larger than the solubility limit at room temperature, and the amount of C exceeding the solubility limit in steel is precipitated in the form of carbides.

As with C, N (nitrogen) is also an interstitial solute element in steel, and the amount of N exceeding the solubility limit in steel is precipitated in the form of nitrides. The solubility limit of N (nitrogen) in steel at room temperature is higher than the solubility limit of C in steel at room temperature. Thus, the number of N atoms that can be dissolved in steel is greater than the number of C atoms that can be dissolved in steel.

The inventors have investigated the mechanical properties of a hot-rolled steel sheet as a material when the amount of N dissolved in the steel is increased, and an electric resistance welded steel pipe manufactured by pipe production from the material and have found that the work hardening ability of the material is improved by increasing the amount of N dissolved in the steel and a low yield ratio is obtained after pipe production. However, it has also been found that N is pinned to dislocations introduced during the pipe production to cause a deterioration in toughness.

The inventors have further conducted intensive studies and have found that in the case where the average grain size of a steel microstructure at the ½t position (t: sheet thickness, wall thickness) of a hot-rolled steel sheet and the base steel portion of an electric resistance welded steel pipe (that is, for the hot-rolled steel sheet, "position of ½ of the sheet thickness t", and for the electric resistance welded steel pipe, "position of ½ of the wall thickness t of the base steel portion", and the same applies hereinafter) is 20.0 μm or less and where the N content is appropriately set, excellent toughness, high strength, and a low yield ratio are provided.

Aspects of the present invention have been completed on the basis of these findings, and the gist thereof is described below.

[1] A hot-rolled steel sheet for an electric resistance welded steel pipe has a chemical composition containing, by mass %:
C: 0.030% or more and 0.20% or less,
Si: 0.02% or more and 1.0% or less,
Mn: 0.40% or more and 3.0% or less,
P: 0.050% or less,
S: 0.020% or less,
N: 0.0070% or more and 0.10% or less, and
Al: 0.005% or more and 0.080% or less,
the balance being Fe and incidental impurities,
in which N dissolved in a steel is contained in an amount of 0.0010% or more and 0.090% or less, and
letting a sheet thickness be t, a steel microstructure at a ½t position has an average grain size of 20.0 μm or less.

[2] In the hot-rolled steel sheet for an electric resistance welded steel pipe described in [1], the chemical composition further contains, by mass %, one or two or more selected from:
Nb: 0.15% or less,
V: 0.15% or less,
Ti: 0.050% or less,
Cu: 1.0% or less,
Ni: 1.0% or less,
Cr: 0.20% or less,
Mo: 0.20% or less,
Ca: 0.010% or less, and
B: 0.0050% or less.

[3] In the hot-rolled steel sheet for an electric resistance welded steel pipe described in [1] or [2], the steel microstructure at the ½t position contains 90% or more bainite in terms of volume fraction, and the remainder contains one or two or more selected from ferrite, pearlite, martensite, and austenite.

[4] In the hot-rolled steel sheet for an electric resistance welded steel pipe described in any one of [1] to [3], the sheet thickness is more than 17 mm and 30 mm or less.

[5] A method for manufacturing the hot-rolled steel sheet for an electric resistance welded steel pipe described in any one of [1] to [4] includes:
heating a steel material having the chemical composition according to [1] or [2] to a heating temperature: 1,100° C. or higher and 1,300° C. or lower;
then performing hot rolling at a rough rolling finishing temperature: 900° C. or higher and 1,100° C. or lower, a finish rolling start temperature: 800° C. or higher and 950° C. or lower, a finish rolling finishing temperature: 750° C. or higher and 850° C. or lower, and a total rolling reduction in finish rolling: 60% or more;
then performing cooling at an average cooling rate: 10° C./s or more and 30° C./s or less and a cooling stop temperature: 400° C. or higher and 600° C. or lower in terms of a sheet thickness center temperature; and then
performing coiling at a temperature of 400° C. or higher and 600° C. or lower.

[6] An electric resistance welded steel pipe includes a base steel portion and an electric resistance welded portion,
in which the base steel portion has a chemical composition containing, by mass %:
C: 0.030% or more and 0.20% or less,
Si: 0.02% or more and 1.0% or less,
Mn: 0.40% or more and 3.0% or less,
P: 0.050% or less, S: 0.020% or less,
N: 0.0070% or more and 0.10% or less, and
Al: 0.005% or more and 0.080% or less,
   the balance being Fe and incidental impurities,
   N dissolved in a steel is contained in an amount of 0.0010% or more and 0.090% or less, and
   letting a wall thickness of the base steel portion be t, a steel microstructure at a ½t position of the base steel portion has an average grain size of 20.0 µm or less.

[7] In the electric resistance welded steel pipe described in [6], the chemical composition of the base steel portion further contains, by mass %, one or two or more selected from:
   Nb: 0.15% or less,
   V: 0.15% or less,
   Ti: 0.050% or less,
   Cu: 1.0% or less,
   Ni: 1.0% or less,
   Cr: 0.20% or less,
   Mo: 0.20% or less,
   Ca: 0.010% or less, and
   B: 0.0050% or less.

[8] In the electric resistance welded steel pipe described in [6] or [7], the steel microstructure at the ½t position of the base steel portion contains 90% or more bainite in terms of volume fraction, and the remainder contains one or two or more selected from ferrite, pearlite, martensite, and austenite.

[9] In the electric resistance welded steel pipe described in any one of [6] to [8], the wall thickness of the base steel portion is more than 17 mm and 30 mm or less.

[10] A method for manufacturing an electric resistance welded steel pipe includes subjecting the hot-rolled steel sheet described in [1] or [2] to cold roll forming into an open pipe having a cylindrical shape, allowing both circumferential end portions of the open pipe to butt against each other, and performing electric resistance welding.

[11] A method for manufacturing an electric resistance welded steel pipe includes:
   heating a steel material having the chemical composition described in [1] or [2] to a heating temperature: 1,100° C. or higher and 1,300° C. or lower;
   then performing hot rolling at a rough rolling finishing temperature: 900° C. or higher and 1,100° C. or lower, a finish rolling start temperature: 800° C. or higher and 950° C. or lower, a finish rolling finishing temperature: 750° C. or higher and 850° C. or lower, and a total rolling reduction in finish rolling: 60% or more;
   then performing cooling at an average cooling rate: 10° C./s or more and 30° C./s or less and a cooling stop temperature: 400° C. or higher and 600° C. or lower in terms of a sheet thickness center temperature;
   then performing coiling at a temperature of 400° C. or higher and 600° C. or lower to provide a hot-rolled steel sheet; and then
   subjecting the hot-rolled steel sheet to cold roll forming into an open pipe having a cylindrical shape, allowing both circumferential end portions of the open pipe to butt against each other, and performing electric resistance welding.

[12] A line pipe includes the electric resistance welded steel pipe described in any one of [6] to [9].

[13] A building structure includes the electric resistance welded steel pipe described in any one of [6] to [9].

According to aspects of the present invention, it is possible to provide a hot-rolled steel sheet for an electric resistance welded steel pipe having excellent toughness, high strength, and a low yield ratio, a method for manufacturing the hot-rolled steel sheet, a thick-walled electric resistance welded steel pipe, and a method for manufacturing the thick-walled electric resistance welded steel pipe. According to aspects of the present invention, it is also possible to provide a line pipe and a building structure including the electric resistance welded steel pipe having these characteristics.

BRIEF DESCRIPTION OF THE DRAWINGS

The FIGURE is a cross-sectional view, perpendicular to the pipe axis direction, illustrating the proximity of the weld zone of an electric resistance welded steel pipe according to an embodiment of the present invention.

DETAILED DESCRIPTION OF EMBODIMENTS OF THE INVENTION

Embodiments of the present invention will be described in detail below. The present invention is not limited to embodiments described below. In an electric resistance welded steel pipe, when the electric resistance welded portion is set at 0° in a circumferential cross-section of the pipe, the chemical composition and steel microstructure are specified for a base steel portion 90° away from the electric resistance welded portion. While the position 90° away from the electric resistance welded portion is specified here, the same chemical composition and steel microstructure can be obtained, for example, at a position 180° away from the electric resistance welded portion.

A hot-rolled steel sheet according to aspects of the present invention for an electric resistance welded steel pipe has a chemical composition containing, by mass %, C: 0.030% or more and 0.20% or less, Si: 0.02% or more and 1.0% or less, Mn: 0.40% or more and 3.0% or less, P: 0.050% or less, S: 0.020% or less, N: 0.0070% or more and 0.10% or less, and Al: 0.005% or more and 0.080% or less, the balance being Fe and incidental impurities, in which N dissolved in a steel is contained in an amount of 0.0010% or more and 0.090% or less, and letting a sheet thickness be t, a steel microstructure at a ½t position has an average grain size of 20.0 µm or less.

The base steel portion of an electric resistance welded steel pipe according to aspects of the present invention has a chemical composition containing, by mass %, C: 0.030% or more and 0.20% or less, Si: 0.02% or more and 1.0% or less, Mn: 0.40% or more and 3.0% or less, P: 0.050% or less, S: 0.020% or less, N: 0.0070% or more and 0.10% or less, and Al: 0.005% or more and 0.080% or less, the balance being Fe and incidental impurities, N dissolved in a steel is contained in an amount of 0.0010% or more and 0.090% or less, and letting a wall thickness of the base steel portion be t, a steel microstructure at a ½t position has an average grain size of 20.0 µm or less.

The reasons for limiting the chemical composition of the hot-rolled steel sheet for an electric resistance welded steel pipe and the base steel portion of the electric resistance welded steel pipe according to aspects of the present invention will be described. Unless otherwise specified, "%" used to indicate the chemical composition refers to "mass %".

C: 0.030% or More and 0.20% or Less

C is an element that increases the strength of steel by solid solution strengthening and that improves the work hardening ability of steel by inhibiting the recovery of dislocations during deformation due to the fact that C is pinned to dislocations to inhibit the movement thereof. To obtain the target strength and yield ratio in accordance with aspects of the present invention, C needs to be contained in an amount of 0.030% or more. A C content of more than 0.20%, however, results in high proportions of hard pearlite and martensite, thereby reducing the toughness. Accordingly, the C content is 0.030% or more and 0.20% or less. The C content is preferably 0.035% or more and preferably 0.19% or less. The C content is more preferably 0.040% or more and more preferably 0.18% or less. The C content is even more preferably 0.050% or more and even more preferably 0.15% or less.

Si: 0.02% or More and 1.0% or Less

Si is an element that increases the strength of steel by solid solution strengthening, and can be contained as needed. To achieve this effect, Si is desirably contained in an amount of 0.02% or more. A Si content of more than 1.0%, however, results in a higher yield ratio and lower toughness. Accordingly, the Si content is 1.0% or less. The Si content is preferably 0.03% or more and preferably 0.80% or less. The Si content is more preferably 0.05% or more and more preferably 0.50% or less. The Si content is even more preferably 0.15% or more and even more preferably 0.30% or less.

Mn: 0.40% or More and 3.0% or Less

Mn is an element that increases the strength of steel by solid solution strengthening. Mn is also an element that reduces ferrite, bainite, and martensite transformation start temperatures to contribute to microstructural refinement. To obtain the strength and toughness required in accordance with aspects of the present invention, Mn needs to be contained in an amount of 0.40% or more. A Mn content of more than 3.0%, however, results in a higher yield ratio and lower toughness. Accordingly, the Mn content is 0.40% or more and 3.0% or less. The Mn content is preferably 0.50% or more and preferably 2.5% or less. The Mn content is more preferably 0.60% or more and more preferably 2.0% or less. The Mn content is even more preferably 0.70% or more and even more preferably 1.7% or less.

P: 0.050% or Less

P segregates at grain boundaries to make the material nonuniform. Thus, P, as an incidental impurity, is preferably minimized as much as possible. However, a P content of 0.050% or less is acceptable. Accordingly, the P content is 0.050% or less. The P content is preferably 0.040% or less, more preferably 0.030% or less. Although the lower limit of P is not particularly specified, P is preferably 0.002% or more because an excessive reduction of P leads to higher smelting costs.

S: 0.020% or Less

S is usually present in steel in the form of MnS. MnS is spread thinly during hot rolling and adversely affects ductility. For this reason, S is preferably minimized as much as possible in accordance with aspects of the present invention. However, a S content of 0.020% or less is acceptable. Accordingly, the S content is 0.020% or less. The S content is preferably 0.015% or less, more preferably 0.010% or less. Although the lower limit of S is not particularly specified, S is preferably 0.0002% or more because an excessive reduction of S leads to higher smelting costs.

N: 0.0070% or More and 0.10% or Less

N is an element that increases the strength of steel by solid solution strengthening and that improves the work hardening ability of steel by inhibiting the recovery of dislocations during deformation due to the fact that N is pinned to dislocations to inhibit the movement thereof. To obtain the strength and yield ratio required in accordance with aspects of the present invention, N needs to be contained in an amount of 0.0070% or more. A N content of more than 0.10%, however, results in a higher proportion of a hard microstructure consisting of the eutectoid microstructure of iron and iron nitride (ferrite+$\gamma'$-$Fe_4N$), thereby leading to lower toughness. In addition, a large amount of $N_2$ gas is generated in the molten steel during welding, and blowholes are easily formed in the weld zone, thereby deteriorating weldability and the strength and toughness of the weld zone. Accordingly, the N content is 0.0070% or more and 0.10% or less. The N content is preferably 0.0080% or more and preferably 0.090% or less. The N content is more preferably 0.0090% or more and more preferably 0.080% or less. The N content is even more preferably 0.010% or more and even more preferably 0.070% or less.

Al: 0.005% or More and 0.080% or Less

Al is an element that acts as a strong deoxidizing agent. To obtain this effect, Al is contained in an amount of 0.005% or more. An Al content of more than 0.080%, however, results in a deterioration in weldability and an increase in alumina inclusions, thereby deteriorating the surface quality. In addition, the toughness of the weld zone is deteriorated. Accordingly, the Al content is 0.005% or more and 0.080% or less. The Al content is preferably 0.007% or more and preferably 0.070% or less. The Al content is more preferably 0.009% or more and more preferably 0.050% or less.

The balance is Fe and incidental impurities. However, as an incidental impurity, O (oxygen) may be contained in an amount of 0.005% or less as long as the advantageous effects according to aspects of the present invention are not impaired.

The above components are contained in the basic chemical composition of the hot-rolled steel sheet for an electric resistance welded steel pipe and the base steel portion of the electric resistance welded steel pipe in accordance with aspects of the present invention. The target characteristics in accordance with aspects of the present invention can be obtained with the essential elements described above. In addition, the elements below can be contained as needed.

One or Two or More Selected from Nb: 0.15% or Less, V: 0.15% or Less, Ti: 0.050% or Less, Cu: 1.0% or Less, Ni: 1.0% or Less, Cr: 0.20% or Less, Mo: 0.20% or Less, Ca: 0.010% or Less, and B: 0.0050% or Less Nb: 0.15% or Less Nb is an element that forms fine carbides and nitrides in steel to contribute to improving the strength of steel and that also inhibits the coarsening of austenite during hot rolling to contribute to microstructural refinement, and can be contained as needed. To obtain the effects described above, when Nb is contained, Nb is preferably contained in an amount of 0.005% or more. A Nb content of more than 0.15%, however, may result in a higher yield ratio and lower toughness. Accordingly, when Nb is contained, the Nb content is preferably 0.15% or less and preferably 0.005% or more. The Nb content is more preferably 0.008% or more and more preferably 0.13% or less. The Nb content is even more preferably 0.010% or more and even more preferably 0.10% or less.

V: 0.15% or Less

V is an element that forms fine carbides and nitrides in steel to contribute to improving the strength of the steel, and can be contained as needed. To obtain the effect described above, when V is contained, V is preferably contained in an amount of 0.005% or more. A V content of more than 0.15%, however, may result in a higher yield ratio and lower toughness. Accordingly, when V is contained, the V content is preferably 0.15% or less and preferably 0.005% or more. The V content is more preferably 0.008% or more and more preferably 0.13% or less. The V content is even more preferably 0.010% or more and even more preferably 0.10% or less.

Ti: 0.050% or Less

Ti is an element that forms fine carbides and nitrides in steel to contribute to improving the strength of the steel, and can be contained as needed. To obtain the effect above, when Ti is contained, Ti is preferably contained in an amount of 0.005% or more. Ti has a high affinity with N; thus, a Ti content of more than 0.050%, however, may result in a smaller amount of N dissolved and a higher yield ratio. Accordingly, when Ti is contained, the Ti content is preferably 0.050% or less and preferably 0.005% or more. The Ti content is more preferably 0.006% or more and more preferably 0.030% or less. The Ti content is even more preferably 0.007% or more and even more preferably 0.025% or less.

Cu: 1.0% or Less, Ni: 1.0% or Less, Cr: 0.20% or Less, and Mo: 0.20% or Less

Cu, Ni, Cr, and Mo are elements that increase the strength of steel by solid solution strengthening, and they can be contained as needed. Excessive amounts of Cu, Ni, Cr, and Mo contained may lead to a higher yield ratio and lower toughness. Accordingly, when Cu, Ni, Cr, and Mo are contained, Cu: 1.0% or less, Ni: 1.0% or less, Cr: 0.20% or less, and Mo: 0.20% or less are preferred.

Cu is preferably 0.01% or more, more preferably 0.02% or more, even more preferably 0.04% or more. Cu is more preferably 0.9% or less, even more preferably 0.8% or less.

Ni is preferably 0.01% or more, more preferably 0.02% or more, even more preferably 0.04% or more. Ni is more preferably 0.9% or less, even more preferably 0.8% or less.

Cr is preferably 0.01% or more, more preferably 0.02% or more, even more preferably 0.04% or more. Cr is more preferably 0.18% or less, even more preferably 0.15% or less.

Mo is preferably 0.01% or more, more preferably 0.02% or more, even more preferably 0.04% or more. Mo is more preferably 0.18% or less, even more preferably 0.15% or less.

Ca: 0.010% or Less

Ca is an element that spheroidizes sulfides, such as MnS which spread thinly during hot rolling, to contribute to improving the toughness of steel, and can be contained as needed. To obtain the effect above, when Ca is contained, Ca is preferably contained in an amount of 0.0005% or more. A Ca content of more than 0.010%, however, may result in the formation of Ca oxide clusters in steel to deteriorate the toughness. Accordingly, when Ca is contained, the Ca content is preferably 0.010% or less. The Ca content is preferably 0.0005% or more, more preferably 0.0008% or more, and more preferably 0.0080% or less. The Ca content is even more preferably 0.0010% or more and even more preferably 0.0060% or less.

B: 0.0050% or Less

B is an element that reduces the ferrite transformation start temperature to contribute to microstructural refinement, and can be contained as needed. To obtain the effect above, when B is contained, B is preferably contained in an amount of 0.0003% or more. A B content of more than 0.0050%, however, may result in a higher yield ratio to deteriorate the toughness. Accordingly, when B is contained, the B content is preferably 0.0050% or less. The B content is preferably 0.0003% or more, more preferably 0.0005% or more, and more preferably 0.0030% or less. The B content is even more preferably 0.0008% or more and even more preferably 0.0010% or less.

In accordance with aspects of the present invention, the amount of N dissolved in steel in addition to the above chemical composition is 0.0010% (mass %) or more and 0.090% (mass %) or less.

When the amount of N dissolved in steel is less than 0.0010%, the work hardening ability of the steel is deteriorated, thus failing to obtain a target yield ratio in accordance with aspects of the present invention. When the amount of N dissolved in steel is more than 0.090%, the proportion of a hard microstructure consisting of the eutectoid microstructure of iron and iron nitride (ferrite+$\gamma'$-$Fe_4N$) is increased to deteriorate the toughness. In addition, a large amount of $N_2$ gas is generated in the molten steel during welding, and blowholes are easily formed in the weld zone, thereby deteriorating weldability and the strength and toughness of the weld zone. To obtain the amount of N dissolved in steel within the above range, it is sufficient that the steel has the above chemical composition. The amount of N dissolved in steel is 0.0010% or more and 0.090% or less, preferably 0.0015% or more and preferably 0.085% or less, more preferably 0.0020% or more and more preferably 0.080% or less, even more preferably 0.0040% or more and even more preferably 0.030% or less.

The reasons for limiting the steel microstructure of the hot-rolled steel sheet for an electric resistance welded steel pipe and the base steel portion of the electric resistance welded steel pipe according to aspects of the present invention will be described below.

Average Grain Size of Steel Microstructure of Hot-Rolled Steel Sheet for Electric Resistance Welded Steel Pipe at ½t Position and Base Steel Portion of Electric Resistance Welded Steel Pipe at ½t Position: 20.0 µm or Less The average grain size in accordance with aspects of the present invention refers to the average equivalent circle diameter of crystal grains when a region surrounded by a boundary with a crystallographic misorientation (difference in orientation between adjacent crystals) of 15° or more is defined as a crystal grain. The equivalent circle diameter (grain size) used here is defined as the diameter of a circle having an area equal to a target crystal grain. Boundaries having a crystal misorientation of 15° or more are called high-angle grain boundaries and provide resistance to brittle fracture. When the steel microstructure at the ½t position has an average grain size of 20.0 µm or less, the total area of the high-angle grain boundaries is increased, thereby achieving the target strength and toughness in accordance with aspects of the present invention. The steel microstructure at the ½t position more preferably has an average grain size of 15.0 µm or less.

The lower limit of the average grain size of the steel microstructure at the ½t position is not particularly specified. A smaller average grain size results in a higher yield ratio; thus, from the viewpoint of achieving a low yield ratio, the average grain size is preferably 2.0 µm or more, more preferably 4.0 µm or more.

The crystal misorientation and the average grain size can be measured by a SEM/EBSD method. Here, they can be measured by a method described in Examples below.

In accordance with aspects of the present invention, in addition to the above-mentioned conditions, the above steel microstructure preferably contains 90% or more bainite in terms of volume fraction and the remainder that contains one or two or more selected from ferrite, pearlite, martensite, and austenite. The above pearlite contains both a eutectoid microstructure of iron and iron carbide (ferrite+cementite) and a eutectoid microstructure of iron and iron nitride (ferrite+$\gamma'$-$Fe_4N$).

Volume Fraction of Bainite: 90% or More

Bainite is a microstructure that is harder than ferrite and softer than pearlite, martensite, and austenite, and has excellent toughness. When the bainite is mixed with a microstructure of different hardness, the interface is likely to be the starting point of fracture due to the stress concentration caused by the hardness difference, resulting in lower toughness. For this reason, the volume fraction of bainite is preferably 90% or more, more preferably 93% or more, even more preferably 95% or more, of the entire steel microstructure at the ½t position described above.

Remainder: One or Two or More Selected from Ferrite, Pearlite, Martensite, and Austenite The remaining microstructures other than bainite contain one or two or more selected from ferrite, pearlite, martensite, and austenite. When the total volume fraction of the microstructures is more than 10%, stress concentration due to the hardness difference with bainite occurs easily, and the interface acts as a fracture starting point, resulting in lower toughness. For this reason, the total volume fraction of the microstructures in the remaining microstructure is preferably 10% or less, more preferably 5% or less, of the entire steel microstructure at the ½t position described above.

In the above various microstructures excluding austenite, austenite grain boundaries or deformation bands within austenite grains serve as nucleation sites. As described below, in hot rolling, a large rolling reduction at a low temperature at which recrystallization of austenite is less likely to occur can introduce a large number of dislocations into austenite to refine austenite and introduce a large number of deformation bands into grains. This increases the area of nucleation sites and the frequency of nucleation; thus, the steel microstructure can be refined as described above.

A method for manufacturing a hot-rolled steel sheet for an electric resistance welded steel pipe according to an embodiment according to aspects of the present invention will be described below.

A hot-rolled steel sheet for an electric resistance welded steel pipe according to aspects of the present invention is manufactured by, for example, heating a steel material having the foregoing chemical composition to a heating temperature: 1,100° C. or higher and 1,300° C. or lower, then performing hot rolling at a rough rolling finishing temperature: 900° C. or higher and 1,100° C. or lower, a finish rolling start temperature: 800° C. or higher and 950° C. or lower, a finish rolling finishing temperature: 750° C. or higher and 850° C. or lower, and a total rolling reduction in finish rolling: 60% or more, then performing cooling at an average cooling rate: 10° C./s or more and 30° C./s or less and a cooling stop temperature: 400° C. or higher and 600° C. or lower in terms of a sheet thickness center temperature, and then performing coiling at a temperature of 400° C. or higher and 600° C. or lower.

In the following description of the manufacturing method, the expression "° C." relating to temperature refers to the surface temperature of a steel material or steel sheet (hot-rolled steel sheet), unless otherwise specified. The surface temperature can be measured with, for example, a radiation thermometer. The temperature at the center of the sheet thickness of the steel sheet can be determined by calculating the temperature distribution in the cross section of the steel sheet using heat-transfer analysis and correcting the result with the surface temperature of the steel sheet. The term "hot-rolled steel sheet" includes a hot-rolled steel sheet and a hot-rolled steel strip.

In accordance with aspects of the present invention, a method for making a steel material (steel slab) is not limited to a particular method. Any known method for making steel using a furnace, such as a converter, an electric furnace, or a vacuum melting furnace, may be employed. A casting process is not limited to a particular method. The steel material is cast by a known casting process, such as a continuous casting process, into desired dimensions. An ingot-casting, slabbing rolling process may be employed without problems, in place of the continuous casting process. The molten steel may be further subjected to secondary refining, such as ladle refining.

Heating Temperature: 1,100° C. or Higher and 1,300° C. or Lower

A heating temperature of lower than 1,100° C. results in a large deformation resistance of the material to be rolled, thus making it difficult to perform rolling. A heating temperature of higher than 1,300° C. results in coarsening of austenite grains to fail to form fine austenite grains in subsequent rolling (rough rolling and finishing rolling), thus making it difficult to ensure the target average grain size of the steel microstructure in accordance with aspects of the present invention. Accordingly, the heating temperature is 1,100° C. or higher and 1,300° C. or lower, preferably 1,120° C. or higher and preferably 1,280° C. or lower.

Any of the following processes may be employed in accordance with aspects of the present invention without problems: a conventional process in which a steel slab (slab) is produced, temporarily cooled to room temperature, and reheated; and an energy-saving process, such as hot charge rolling, in which a warm steel slab is transferred into a heating furnace without cooling to room temperature or in which a steel slab is hot-rolled immediately after being subjected to heat retaining for a short period.

Rough Rolling Finishing Temperature: 900° C. or Higher and 1,100° C. or Lower

At a rough rolling finishing temperature of lower than 900° C., the surface temperature of the steel sheet is equal to or lower than the ferrite transformation start temperature during the subsequent finish rolling. This results in the formation of a large amount of deformed ferrite, thereby leading to lower strength and a higher yield ratio. A rough rolling finishing temperature of higher than 1,100° C. results in coarsening of austenite and insufficient introduction of deformation bands into austenite, thereby failing to obtain the target average grain size of the steel microstructure in accordance with aspects of the present invention. Accordingly, the rough rolling finishing temperature is 900° C. or higher and 1,100° C. or lower, preferably 910° C. or higher and preferably 1,000° C. or lower.

Finish Rolling Start Temperature: 800° C. or Higher and 950° C. or Lower

At a finish rolling start temperature of lower than 800° C., the surface temperature of the steel sheet is equal to or lower than the ferrite transformation start temperature during the finish rolling, resulting in the formation of a large amount of deformed ferrite. This results in lower strength and a higher yield ratio. A finish rolling start temperature of higher than 950° C. results in coarsening of austenite and insufficient introduction of deformation bands in austenite, thereby failing to obtain the target average grain size of the steel microstructure in accordance with aspects of the present invention. Accordingly, the finish rolling start temperature is 800° C. or higher and 950° C. or lower, preferably 820° C. or higher and preferably 930° C. or lower.

Finish Rolling Finishing Temperature: 750° C. or Higher and 850° C. or Lower

At a finish rolling finishing temperature of lower than 750° C., the surface temperature of the steel sheet is equal to or lower than the ferrite transformation start temperature during the finish rolling, resulting in the formation of a large amount of deformed ferrite. This results in lower strength and a higher yield ratio. A finish rolling finishing temperature of higher than 850° C. results in coarsening of austenite and insufficient introduction of deformation bands in austenite, thereby failing to obtain the target average grain size of the steel microstructure in accordance with aspects of the present invention. Accordingly, the finish rolling finishing temperature is 750° C. or higher and 850° C. or lower, preferably 770° C. or higher and preferably 830° C. or lower.

Total Rolling Reduction in Finish Rolling: 60% or More

A total rolling reduction of less than 60% in the finish rolling results in coarsening of austenite and insufficient introduction of deformation bands in austenite, thereby failing to obtain the target average grain size of the steel microstructure in accordance with aspects of the present invention. The total rolling reduction in the finish rolling is preferably 65% or more. The upper limit thereof is not particularly specified. At a total rolling reduction of more than 80%, the effect of improving the toughness is small with respect to an increase in rolling reduction, leading to only an increase in facility load. Thus, the total rolling reduction in the finish rolling is preferably 80% or less, more preferably 75% or less.

The total rolling reduction described above refers to the sum of the rolling reductions in rolling passes in the finish rolling.

In accordance with aspects of the present invention, the finishing sheet thickness (sheet thickness of the steel sheet after finish rolling) is preferably more than 17 mm and 30 mm or less from the viewpoint of securing the necessary rolling reduction and controlling the temperature of the steel sheet.

Average Cooling Rate: 10° C./s or More and 30° C./s or Less

When the average cooling rate in the temperature range from the start of cooling to the end of the cooling described below at the sheet thickness center temperature of the hot-rolled steel sheet is less than 10° C./s, the frequency of bainite nucleation is low, thus failing to obtain the target average grain size of the steel microstructure in accordance with aspects of the present invention. In addition, the desired yield strength is not obtained because of the formation of a large amount of ferrite. An average cooling rate of more than 30° C./s results in the formation of a large amount of martensite, leading to a higher yield ratio and lower toughness. The average cooling rate is 10° C./s or more and 30° C./s or less, preferably 15° C./s or more and preferably 25° C./s or less.

In accordance with aspects of the present invention, the cooling is preferably started immediately after the finish rolling from the viewpoint of suppressing ferrite formation on surfaces of the steel sheet before the cooling.

Cooling Stop Temperature: 400° C. or Higher and 600° C. or Lower

When the cooling stop temperature at the sheet thickness center temperature of the hot-rolled steel sheet is lower than 400° C., a large amount of martensite is formed, thereby resulting in a higher yield ratio and lower toughness. A cooling stop temperature of higher than 600° C. results in a lower frequency of ferrite and bainite nucleation, thereby failing to obtain the target average grain size of the steel microstructure in accordance with aspects of the present invention and the desired fraction of bainite. The cooling stop temperature is 400° C. or higher and 600° C. or lower, preferably 450° C. or higher and preferably 580° C. or lower.

In accordance with aspects of the present invention, unless otherwise specified, the average cooling rate is defined as the value (cooling rate) obtained by ((sheet thickness center temperature of the hot-rolled steel sheet before cooling−sheet thickness center temperature of the hot-rolled steel sheet after cooling)/cooling time). Examples of a cooling method include water cooling, such as spraying water from a nozzle, and cooling by spraying cooling gas. In accordance with aspects of the present invention, it is preferable to perform a cooling operation (treatment) to both sides of the hot-rolled steel sheet so that both sides of the sheet are cooled under the same conditions.

After the cooling, the hot-rolled steel sheet is coiled and then allowed to be naturally cooled.

In view of the steel microstructure, the coiling is performed at a coiling temperature: 400° C. or higher and 600° C. or lower. A coiling temperature of lower than 400° C. results in the formation of a large amount of martensite, thereby leading to a higher yield ratio and lower toughness. A coiling temperature of higher than 600° C. results in a lower frequency of ferrite and bainite nucleation, thereby failing to obtain the target average grain size of the steel microstructure in accordance with aspects of the present invention and the desired fraction of bainite. The coiling temperature is 400° C. or higher and 600° C. or lower, preferably 450° C. or higher and preferably 580° C. or lower.

A method for manufacturing an electric resistance welded steel pipe according to an embodiment of the present invention will be described below.

The electric resistance welded steel pipe according to aspects of the present invention includes a base steel portion and an electric resistance welded portion. The electric resistance welded steel pipe according to aspects of the present invention is manufactured by, for example, heating a steel material having the foregoing chemical composition to a heating temperature: 1,100° C. or higher and 1,300° C. or lower, then performing hot rolling at a rough rolling finishing temperature: 900° C. or higher and 1,100° C. or lower, a finish rolling start temperature: 800° C. or higher and 950° C. or lower, a finish rolling finishing temperature: 750° C. or higher and 850° C. or lower, and a total rolling reduction in finish rolling: 60% or more, then performing cooling at an average cooling rate: 10° C./s or more and 30° C./s or less and a cooling stop temperature: 400° C. or higher and 600° C. or lower in terms of a sheet thickness center temperature, then performing coiling at a temperature of 400° C. or higher and 600° C. or lower to provide a hot-rolled steel sheet, and then performing pipe production in which the hot-rolled steel sheet is subjected to cold roll forming into an open pipe having a cylindrical shape, both circumferential end portions of the open pipe is allowed to butt against each other, and electric resistance welding is performed.

The process up to the point where the hot-rolled steel sheet is obtained by coiling is the same as the description of the hot-rolled steel sheet for an electric resistance welded steel pipe above, and thus is omitted here.

After the coiling, the hot-rolled steel sheet is subjected to pipe production. In the pipe production process, the hot-rolled steel sheet is cold-rolled into a cylindrical open pipe (round steel pipe). Then electric resistance welding is performed as follows: both circumferential end portions (butt portions) of the open pipe are allowed to butt against each other and melted by high-frequency electric resistance heating, and then pressure welding is performed by upsetting with squeeze rolls to form an electric resistance welded steel pipe. After that, the electric resistance welded steel pipe is subjected to drawing with rolls arranged at the top, bottom, left, and right of the electric resistance welded steel pipe by a few percent in the pipe axis direction while keeping the cylindrical shape to adjust the outside diameter to the desired value.

Whether a steel pipe is an electric resistance welded steel pipe can be determined by cutting the electric resistance welded steel pipe perpendicular to the pipe axis direction, polishing the cut surface including the weld zone (electric resistance welded portion), performing etching, and performing observation under an optical microscope.

Specifically, when the circumferential width of the melt-solidified portion of the weld zone (electric resistance welded portion) is 1.0 μm or more and 1000.0 μm or less over the entire thickness of the pipe, the pipe is determined to be an electric resistance welded steel pipe.

Here, an etching solution may be appropriately selected in accordance with the steel composition and the type of steel pipe.

The FIGURE schematically illustrates a portion of the above cross section (near the weld zone of the electric resistance welded steel pipe) after etching. As illustrated in the FIGURE, the melt-solidified portion can be visually identified as a region (melt-solidified portion 3) that has a different microstructure morphology and contrast from a base steel portion 1 and a heat-affected zone 2. For example, the melt-solidified portions of electric resistance welded steel pipes of carbon steel and low-alloy steel can each be identified as a region that is observed as white with an optical microscope in the above cross section etched in nital. Melt-solidified portions of UOE steel pipes of carbon steel and low-alloy steel can each be identified as a region containing a cellular or dendritic solidified microstructure observed with an optical microscope in the above cross section etched in nital.

The hot-rolled steel sheet for an electric resistance welded steel pipe and the electric resistance welded steel pipe according to aspects of the present invention are manufactured by the manufacturing methods described above. The hot-rolled steel sheet for an electric resistance welded steel pipe and the electric resistance welded steel pipe according to aspects of the present invention have a low yield ratio, excellent deformation performance, and high earthquake resistance, especially even when they have a large thickness, for example, even when the sheet thickness and the wall thickness are more than 17 mm. They also have both high strength and excellent toughness.

Thus, the electric resistance welded steel pipe according to aspects of the present invention can be suitably used as a material for building structures, such as line pipes and columns for buildings. In particular, it is suitable for a large structure that requires a low yield ratio and the ability to withstand bending and impact forces from the viewpoint of, for example, earthquake resistance. It is also suitable for a line pipe that requires strength to withstand the internal pressure of a transported fluid and toughness to stop crack propagation at the time of crack formation.

EXAMPLES

Aspects of the present invention will be further described in detail based on the following examples. The present invention is not limited to the following examples.

Molten steels having chemical compositions given in Table 1 were obtained by steelmaking and formed into slabs. The resulting slabs were subjected to hot rolling, cooling, and coiling under the conditions given in Table 2 to produce hot-rolled steel sheets, having sheet thicknesses (finishing sheet thicknesses) (mm) given in Table 2, for electric resistance welded steel pipes.

After the coiling, the resulting sheets were subjected to cold roll forming to form round steel pipes with cylindrical shapes, and the butt portions were subjected to electric resistance welding. The round steel pipes were then subjected to drawing with rolls arranged at the top, bottom, left, and right of the round steel pipes by a few percent in the pipe axis direction to produce electric resistance welded steel pipes having the outside diameters (mm) and wall thicknesses (wall thicknesses of the base steel portions) (mm) given in Table 2.

Test specimens were taken from the hot-rolled steel sheets for electric resistance welded steel pipes and the electric resistance welded steel pipes. Measurement of the amount of N dissolved, microstructure observation, a tensile test, and a Charpy impact test were conducted as described below. In each electric resistance welded steel pipe, the test specimens were taken from a base steel portion 90° away from an electric resistance welded portion when the electric resistance welded portion was set at 0° in a circumferential cross-section of the pipe.

[Measurement of Amount of N Dissolved]

The amount of N dissolved (mass %) was determined by subtracting the amount of N present in the form of precipitates (amount of N precipitated) from the total amount of N in steel. The amount of N precipitated was determined by an electrolytic extraction analysis method using chronoamperometry. In the electrolytic extraction, an acetylacetone-based solution was used as an electrolyte and electrolyzed at a constant potential to dissolve only the base iron portion other than precipitates, such as carbides and nitrides. The extracted residue was chemically analyzed to determine the total amount of N in the residue, which was used as the amount of N precipitated.

[Microstructure Observation]

A test specimen for microstructure observation was taken from each of the hot-rolled steel sheets, polished in such a manner that the observation surface was parallel to a cross section in the rolling direction during the hot rolling at the ½ position of the sheet thickness t from a surface of the steel sheet, and then etched in nital. In the microstructure observation, the microstructure at the ½t position of the sheet thickness was observed and imaged with an optical microscope (magnification: 1,000×) or a scanning electron microscope (SEM, magnification: 1,000×). The area fractions of bainite and the remainder (ferrite, pearlite, martensite, and austenite) were determined from the resulting optical microscopic images and SEM images. The area fraction of each microstructure was determined by observation in five or more fields of view and calculation of the average of the values obtained in the fields of view. The area fraction obtained from the microstructure observation was used as the volume fraction of each microstructure. It can be assumed that the steel microstructure does not change before and after the pipe production; thus, the steel microstructure of the electric resistance welded steel pipe was assumed to be the same as that of the hot-rolled steel sheet. In the case of the electric resistance welded steel pipe, the "½t position of the sheet thickness" and the "½ position of the sheet thickness t" indicate the "½t position of the wall thickness" and the "½ position of the wall thickness t".

Here, ferrite is a product of diffusional transformation and exhibits a nearly recovered microstructure having low dislocation density. This includes polygonal ferrite and pseudo-polygonal ferrite.

Bainite is a dual-phase microstructure of lath-like ferrite and cementite with high dislocation density.

Pearlite is a eutectoid microstructure of iron and iron carbide (ferrite+cementite) or iron and iron nitride (ferrite+$\gamma'$-Fe$_4$N) and exhibits a lamellar microstructure of alternating ferrite and carbide or nitride.

Martensite is a lath-like low-temperature transformation microstructure with a very high dislocation density. The SEM images thereof exhibit a brighter contrast than ferrite and bainite.

It is difficult to distinguish between martensite and austenite in the optical microscopic images and the SEM images. For this reason, the area fraction of the microstructure observed as martensite or austenite was measured from the obtained SEM images, and the value obtained by subtracting the volume fraction of austenite measured by a method described below from the measured value was used as the volume fraction of martensite.

The measurement of the volume fraction of austenite was performed by X-ray diffraction. A test specimen for microstructure observation was produced by grinding in such a manner that the diffraction surface was located at the ½t position of the sheet thickness of the steel sheet or the wall thickness of the steel pipe, and then removing the worked surface layer using chemical polishing to a depth of 50 μm or more. The measurement was performed using Mo-K$\alpha$ radiation, and the volume fraction of austenite was determined from the integrated intensities of the (200), (220), and (311) planes of fcc iron and the (200) and (211) planes of bcc iron.

The average grain size was measured by a SEM/EBSD method. The measurement region was 500 μm×500 μm. The measurement step size was 0.5 μm. The grain size was measured as follows: The misorientation between adjacent crystal grains was determined. The boundaries having an misorientation of 15° or more were defined as crystal grain boundaries. The arithmetic mean of the grain sizes (equivalent circle diameters) was determined from the resulting crystal grain boundaries and used as the average grain size.

In the grain size analysis, crystal grains having a grain size of less than 2.0 μm were excluded from the analysis target as measurement noise, and the resulting area fraction was assumed to be equal to the volume fraction.

[Tensile Test]

In the tensile test, JIS No. 5 tensile test specimens were taken in accordance with JIS Z 2241 (2011) in such a manner that the tensile direction was parallel to the rolling direction for the hot-rolled steel sheets for electric resistance welded steel pipes and that the tensile direction was in the L direction (longitudinal direction of each pipe) for electric resistance welded steel pipes. The tensile test was conducted with each tensile test specimen to measure the yield strength YS and the tensile strength TS. The yield strength YS was defined as the flow stress at a nominal strain of 0.5%.

The yield ratio (YR$_P$) (%), represented by equation (1), of the hot-rolled steel sheet corresponding to that after pipe production was calculated:

$$YR_P = (4.0FS/TS) \times 100 \qquad \text{equation (1)}$$

where in equation (1), "4.0FS" is the flow stress (MPa) at a nominal strain of 4.0%, and TS is the tensile strength (MPa) of the hot-rolled steel sheet.

The yield ratio (YR) of the base steel portion of the electric resistance welded steel pipe (=(yield strength of the base steel portion of the electric resistance welded steel pipe/tensile strength of the base steel portion of the electric resistance welded steel pipe)×100) (%) was calculated.

[Charpy Impact Test]

For the Charpy impact test, V-notch test specimens were taken from the ½t position of the sheet thickness of the resulting hot-rolled steel sheets for electric resistance welded steel pipes and from the ½t position of the wall thickness of the electric resistance welded steel pipes in such a manner that the longitudinal direction of each test specimens was parallel to the rolling width direction or the pipe circumferential direction (perpendicular to the rolling direction or to the pipe longitudinal direction). Then the Charpy impact test was conducted in accordance with JIS Z 2242 (2018). The number of the test specimens was three each. The test was conducted three times at each temperature, and the average was calculated.

Tables 1, 3, and 4 present the results.

TABLE 1

| Steel No. | Chemical composition (mass %) | | | | | | | | |
|---|---|---|---|---|---|---|---|---|---|
| | C | Si | Mn | P | S | N | Al | Nb | V |
| 1 | 0.078 | 0.35 | 1.23 | 0.016 | 0.0008 | 0.0154 | 0.042 | 0.040 | 0.032 |
| 2 | 0.080 | 0.20 | 1.19 | 0.010 | 0.0007 | 0.0039 | 0.029 | 0.040 | 0.031 |
| 3 | 0.141 | 0.04 | 1.10 | 0.007 | 0.0041 | 0.0556 | 0.012 | 0.025 | 0.010 |
| 4 | 0.139 | 0.05 | 1.08 | 0.008 | 0.0020 | 0.0135 | 0.031 | 0.024 | 0.020 |
| 5 | 0.186 | 0.19 | 0.63 | 0.022 | 0.0019 | 0.0744 | 0.048 | 0.012 | 0.015 |
| 6 | 0.027 | 0.27 | 1.49 | 0.015 | 0.0033 | 0.0102 | 0.025 | 0.013 | 0.014 |
| 7 | 0.209 | 0.19 | 1.33 | 0.004 | 0.0012 | 0.0344 | 0.034 | 0.056 | 0.040 |
| 8 | 0.113 | 0.01 | 1.94 | 0.028 | 0.0073 | 0.0163 | 0.023 | 0.023 | 0.019 |
| 9 | 0.065 | 1.12 | 2.87 | 0.025 | 0.0084 | 0.0226 | 0.038 | 0.034 | 0.037 |
| 10 | 0.139 | 0.06 | 0.36 | 0.011 | 0.0007 | 0.0097 | 0.035 | 0.031 | 0.024 |
| 11 | 0.092 | 0.48 | 3.05 | 0.009 | 0.0006 | 0.0241 | 0.045 | 0.015 | 0.041 |
| 12 | 0.149 | 0.23 | 0.98 | 0.052 | 0.0090 | 0.0198 | 0.022 | 0.043 | 0.015 |
| 13 | 0.127 | 0.19 | 1.07 | 0.027 | 0.0230 | 0.0119 | 0.037 | 0.038 | 0.023 |
| 14 | 0.034 | 0.25 | 1.76 | 0.014 | 0.007 | 0.0205 | 0.071 | 0.000 | 0.000 |
| 15 | 0.161 | 0.71 | 2.95 | 0.013 | 0.004 | 0.0143 | 0.042 | 0.018 | 0.000 |
| 16 | 0.115 | 0.18 | 1.22 | 0.046 | 0.003 | 0.0119 | 0.030 | 0.022 | 0.000 |
| 17 | 0.089 | 0.39 | 0.87 | 0.007 | 0.017 | 0.0094 | 0.007 | 0.000 | 0.037 |
| 18 | 0.064 | 0.11 | 1.31 | 0.028 | 0.001 | 0.0076 | 0.022 | 0.000 | 0.000 |
| 19 | 0.139 | 0.03 | 0.82 | 0.009 | 0.003 | 0.0435 | 0.025 | 0.000 | 0.031 |
| 20 | 0.145 | 0.05 | 1.02 | 0.014 | 0.004 | 0.0515 | 0.011 | 0.008 | 0.022 |

TABLE 1-continued

| | Chemical composition (mass %) | | | | | | | |
|---|---|---|---|---|---|---|---|---|
| 21 | 0.099 | 0.23 | 0.91 | 0.021 | 0.001 | 0.0144 | 0.026 | 0.009 | 0.041 |
| 22 | 0.076 | 0.21 | 1.16 | 0.015 | 0.001 | 0.0151 | 0.041 | 0.011 | 0.033 |
| 23 | 0.051 | 0.15 | 1.22 | 0.025 | 0.001 | 0.0081 | 0.032 | 0.000 | 0.000 |
| 24 | 0.083 | 0.32 | 1.49 | 0.018 | 0.001 | 0.0152 | 0.027 | 0.007 | 0.000 |

| Steel No. | Ti | Cr | Mo | Cu | Ni | Ca | B | Dissolved N |
|---|---|---|---|---|---|---|---|---|
| 1 | 0.011 | 0.00 | 0.00 | 0.00 | 0.00 | 0.0023 | 0.0000 | 0.0046 |
| 2 | 0.013 | 0.00 | 0.00 | 0.00 | 0.00 | 0.0000 | 0.0000 | 0.0002 |
| 3 | 0.023 | 0.00 | 0.00 | 0.14 | 0.13 | 0.0000 | 0.0000 | 0.0372 |
| 4 | 0.016 | 0.00 | 0.00 | 0.12 | 0.12 | 0.0042 | 0.0000 | 0.0035 |
| 5 | 0.041 | 0.07 | 0.05 | 0.00 | 0.00 | 0.0000 | 0.0009 | 0.0310 |
| 6 | 0.013 | 0.00 | 0.00 | 0.00 | 0.00 | 0.0000 | 0.0000 | 0.0018 |
| 7 | 0.028 | 0.00 | 0.00 | 0.00 | 0.00 | 0.0027 | 0.0000 | 0.0254 |
| 8 | 0.021 | 0.00 | 0.00 | 0.00 | 0.00 | 0.0013 | 0.0000 | 0.0073 |
| 9 | 0.019 | 0.00 | 0.00 | 0.00 | 0.00 | 0.0035 | 0.0000 | 0.0127 |
| 10 | 0.009 | 0.00 | 0.00 | 0.22 | 0.12 | 0.0014 | 0.0000 | 0.0014 |
| 11 | 0.018 | 0.00 | 0.00 | 0.00 | 0.00 | 0.0011 | 0.0000 | 0.0159 |
| 12 | 0.017 | 0.00 | 0.00 | 0.00 | 0.00 | 0.0000 | 0.0000 | 0.0135 |
| 13 | 0.014 | 0.00 | 0.00 | 0.00 | 0.00 | 0.0000 | 0.0000 | 0.0018 |
| 14 | 0.000 | 0.00 | 0.00 | 0.00 | 0.00 | 0.0000 | 0.0000 | 0.0086 |
| 15 | 0.025 | 0.00 | 0.00 | 0.00 | 0.00 | 0.0000 | 0.0000 | 0.0019 |
| 16 | 0.022 | 0.13 | 0.11 | 0.00 | 0.00 | 0.0000 | 0.0000 | 0.0012 |
| 17 | 0.014 | 0.18 | 0.17 | 0.00 | 0.00 | 0.0000 | 0.0000 | 0.0038 |
| 18 | 0.000 | 0.00 | 0.00 | 0.00 | 0.00 | 0.0000 | 0.0000 | 0.0054 |
| 19 | 0.017 | 0.00 | 0.00 | 0.16 | 0.10 | 0.0000 | 0.0000 | 0.0415 |
| 20 | 0.011 | 0.00 | 0.00 | 0.11 | 0.13 | 0.0000 | 0.0000 | 0.0388 |
| 21 | 0.010 | 0.00 | 0.00 | 0.00 | 0.00 | 0.0019 | 0.0000 | 0.0045 |
| 22 | 0.029 | 0.00 | 0.00 | 0.00 | 0.00 | 0.0036 | 0.0000 | 0.0011 |
| 23 | 0.000 | 0.00 | 0.00 | 0.00 | 0.00 | 0.0000 | 0.0000 | 0.0041 |
| 24 | 0.052 | 0.00 | 0.00 | 0.00 | 0.00 | 0.0025 | 0.0000 | 0.0004 |

*1. The chemical composition consists of, in addition to the above, the balance Fe and incidental impurities.

TABLE 2

| | Hot-rolled steel sheet | | | | | | | | | |
|---|---|---|---|---|---|---|---|---|---|---|
| | Hot-rolling conditions | | | | | Cooling conditions | | Coiling | | |
| | | Rough rolling finishing | Finish rolling start | Finish rolling finishing | | Average | Cooling stop | Coiling condition Coiling | Steel sheet dimension | Steel pipe dimensions | |
| Steel No. | Heating temperature (° C.) | temperature (° C.) | temperature (° C.) | temperature (° C.) | Total rolling reduction in finish rolling (%) | cooling rate (° C./s) | temperature (° C.) | temperature (° C.) | Sheet thickness (mm) | Outside diameter (mm) | Wall thickness (mm) |
| 1 | 1150 | 1020 | 910 | 830 | 64 | 26 | 510 | 480 | 23.8 | 406.4 | 23.8 |
| 2 | 1140 | 1050 | 930 | 820 | 64 | 14 | 530 | 510 | 22.2 | 406.4 | 22.2 |
| 3 | 1200 | 970 | 890 | 780 | 71 | 15 | 540 | 515 | 22.2 | 406.4 | 22.2 |
| 4 | 1200 | 990 | 930 | 810 | 52 | 21 | 570 | 550 | 19.1 | 406.4 | 19.1 |
| 5 | 1250 | 940 | 880 | 790 | 74 | 23 | 475 | 455 | 28.0 | 609.6 | 28.0 |
| 6 | 1160 | 960 | 840 | 800 | 70 | 18 | 500 | 480 | 25.4 | 508.0 | 25.4 |
| 7 | 1210 | 980 | 860 | 780 | 73 | 24 | 515 | 490 | 25.0 | 600.0 | 25.0 |
| 8 | 1150 | 990 | 870 | 820 | 68 | 17 | 575 | 560 | 28.0 | 700.0 | 28.0 |
| 9 | 1130 | 950 | 840 | 790 | 67 | 22 | 490 | 470 | 25.0 | 600.0 | 25.0 |
| 10 | 1180 | 940 | 890 | 800 | 70 | 18 | 570 | 550 | 25.4 | 508.0 | 25.4 |
| 11 | 1230 | 970 | 920 | 790 | 71 | 18 | 490 | 470 | 22.0 | 406.4 | 22.0 |
| 12 | 1250 | 990 | 910 | 820 | 68 | 13 | 560 | 540 | 25.0 | 600.0 | 25.0 |
| 13 | 1240 | 1000 | 930 | 790 | 70 | 16 | 550 | 535 | 25.0 | 600.0 | 25.0 |
| 14 | 1280 | 980 | 940 | 850 | 71 | 18 | 430 | 415 | 17.5 | 406.4 | 17.5 |
| 15 | 1110 | 900 | 810 | 750 | 72 | 28 | 420 | 400 | 16.0 | 406.4 | 16.0 |
| 16 | 1170 | 1070 | 900 | 820 | 67 | 22 | 565 | 530 | 22.0 | 400.0 | 22.0 |
| 17 | 1200 | 950 | 890 | 810 | 66 | 20 | 515 | 490 | 19.1 | 406.4 | 19.1 |
| 18 | 1220 | 990 | 910 | 800 | 62 | 16 | 590 | 575 | 25.4 | 508.0 | 25.4 |
| 19 | 1320 | 1020 | 940 | 830 | 62 | 23 | 460 | 440 | 19.1 | 406.4 | 19.1 |
| 20 | 1200 | 1110 | 920 | 840 | 66 | 19 | 520 | 505 | 22.2 | 406.4 | 22.2 |
| 21 | 1250 | 1070 | 960 | 880 | 71 | 24 | 430 | 405 | 23.8 | 508.0 | 23.8 |
| 22 | 1280 | 960 | 900 | 840 | 60 | 8 | 550 | 530 | 19.1 | 406.4 | 19.1 |
| 23 | 1270 | 1070 | 920 | 830 | 63 | 12 | 630 | 615 | 19.1 | 406.4 | 19.1 |
| 24 | 1190 | 1050 | 910 | 790 | 68 | 18 | 530 | 510 | 25.4 | 508.0 | 25.4 |

TABLE 3

Hot-rolled steel sheet

| Steel No. | Steel microstructure Volume fraction of bainite (%) | Balance | Average grain size (μm) | YS (MPa) | 4.0FS (MPa) | TS (MPa) | YR$_P$ (%) | vTrs (° C.) | Remarks |
|---|---|---|---|---|---|---|---|---|---|
| 1 | 98 | F, P | 6.3 | 537 | 542 | 619 | 87.6 | −70 | Inventive example |
| 2 | 99 | F, P | 7.1 | 503 | 529 | 568 | 93.1 | −65 | Comparative example |
| 3 | 95 | M | 5.3 | 472 | 481 | 554 | 86.8 | −75 | Inventive example |
| 4 | 96 | M | 22.4 | 484 | 490 | 561 | 87.3 | −35 | Comparative example |
| 5 | 91 | F, P, M | 8.7 | 505 | 507 | 569 | 89.1 | −65 | Inventive example |
| 6 | 98 | F | 6.6 | 434 | 442 | 509 | 86.8 | −70 | Comparative example |
| 7 | 86 | F, P | 7.4 | 499 | 513 | 580 | 88.4 | −30 | Comparative example |
| 8 | 92 | F, P | 8.5 | 439 | 441 | 515 | 85.6 | −70 | Comparative example |
| 9 | 96 | F, P | 7.0 | 561 | 573 | 619 | 92.6 | −45 | Comparative example |
| 10 | 87 | F, P | 21.3 | 418 | 424 | 487 | 87.1 | −25 | Comparative example |
| 11 | 98 | F, P | 6.2 | 536 | 550 | 593 | 92.7 | −50 | Comparative example |
| 12 | 93 | F, P | 11.0 | 492 | 508 | 581 | 87.4 | −35 | Comparative example |
| 13 | 94 | F, P | 9.7 | 501 | 513 | 579 | 88.6 | −40 | Comparative example |
| 14 | 99 | F, P | 6.9 | 528 | 534 | 619 | 86.3 | −65 | Inventive example |
| 15 | 92 | M | 5.1 | 515 | 520 | 595 | 87.4 | −70 | Inventive example |
| 16 | 94 | M, A | 7.3 | 537 | 548 | 632 | 86.7 | −75 | Inventive example |
| 17 | 95 | M | 5.5 | 460 | 472 | 538 | 87.7 | −65 | Inventive example |
| 18 | 96 | F | 8.9 | 494 | 503 | 577 | 87.2 | −60 | Inventive example |
| 19 | 91 | M | 23.4 | 510 | 522 | 589 | 88.6 | −25 | Comparative example |
| 20 | 92 | M | 22.8 | 486 | 492 | 556 | 88.5 | −30 | Comparative example |
| 21 | 97 | M | 25.1 | 529 | 537 | 612 | 87.7 | −20 | Comparative example |
| 22 | 73 | F | 21.1 | 418 | 429 | 492 | 87.2 | −40 | Comparative example |
| 23 | 76 | F, P | 24.0 | 425 | 437 | 506 | 86.4 | −50 | Comparative example |
| 24 | 93 | F, P | 6.3 | 482 | 515 | 557 | 92.5 | −70 | Comparative example |

*1. F: ferrite, P: pearlite, M: martensite, A: austenite

TABLE 4

Electric resistance welded steel pipe

| Steel No. | Mechanical properties YS (MPa) | TS (MPa) | YR (%) | Base steel portion vTrs (° C.) | Remarks |
|---|---|---|---|---|---|
| 1 | 551 | 627 | 87.9 | −55 | Inventive example |
| 2 | 536 | 580 | 92.4 | −50 | Comparative example |
| 3 | 492 | 563 | 87.4 | −65 | Inventive example |
| 4 | 494 | 588 | 84.0 | −25 | Comparative example |
| 5 | 518 | 589 | 87.9 | −50 | Inventive example |
| 6 | 438 | 512 | 85.5 | −60 | Comparative example |
| 7 | 536 | 628 | 85.4 | −20 | Comparative example |
| 8 | 448 | 519 | 87.3 | −55 | Comparative example |
| 9 | 574 | 621 | 92.4 | −30 | Comparative example |
| 10 | 441 | 495 | 89.1 | −10 | Comparative example |
| 11 | 554 | 599 | 92.5 | −30 | Comparative example |
| 12 | 497 | 584 | 85.1 | −25 | Comparative example |
| 13 | 520 | 592 | 87.8 | −15 | Comparative example |
| 14 | 528 | 591 | 89.3 | −55 | Inventive example |
| 15 | 527 | 601 | 87.7 | −60 | Inventive example |
| 16 | 556 | 637 | 87.3 | −45 | Inventive example |
| 17 | 470 | 529 | 88.8 | −55 | Inventive example |
| 18 | 508 | 592 | 85.8 | −40 | Inventive example |
| 19 | 531 | 611 | 86.9 | −5 | Comparative example |
| 20 | 499 | 564 | 88.5 | −15 | Comparative example |
| 21 | 534 | 618 | 86.4 | 0 | Comparative example |
| 22 | 438 | 509 | 86.1 | −15 | Comparative example |
| 23 | 440 | 493 | 89.2 | −30 | Comparative example |
| 24 | 523 | 564 | 92.7 | −45 | Comparative example |

In Tables 3 and 4, steel Nos. 1, 3, 5, and 14 to 18 are inventive examples, and steel Nos. 2, 4, 6 to 13, and 19 to 24 are comparative examples.

The hot-rolled steel sheets for electric resistance welded steel pipes and the base steel portions of the electric resistance welded steel pipes of the inventive examples each had a chemical composition containing C: 0.030% or more and 0.20% or less, Si: 0.02% or more and 1.0% or less, Mn: 0.40% or more and 3.0% or less, P: 0.050% or less, S: 0.020% or less, N: 0.0070% or more and 0.10% or less, Al: 0.005% or more and 0.080% or less, in which N dissolved in steel was contained in an amount of 0.0010% or more and 0.090% or less, and the steel microstructure at the ½t position had an average grain size of 20.0 μm or less.

Each of the hot-rolled steel sheets for electric resistance welded steel pipes of the inventive examples had a yield stress of 450 MPa or more, a ductile-to-brittle transition temperature of −60° C. or lower in the Charpy impact test, and a yield ratio YR$_P$, corresponding to that after pipe production, of 90.0% or less.

Each of the electric resistance welded steel pipes of the inventive examples had a yield stress of 450 MPa or more, a ductile-to-brittle transition temperature of −40° C. or less in the Charpy impact test, and a yield ratio of 90.0% or less.

In steel No. 2 of the comparative example, the yield ratio did not reach the desired value because the N content was lower than the range of the present invention.

In steel No. 4 of the comparative example, the low total rolling reduction in the finish rolling resulted in the coarsened crystal grains, leading to the average grain size exceeding the range of present invention. Thus, the ductile-to-brittle transition temperature in the Charpy impact test did not reach the desired value.

In steel No. 6 of the comparative example, the C content was lower than the range of the present invention; thus, the yield stress did not reach the desired value.

In steel No. 7 of the comparative example, the C content was higher than the range of the present invention; thus, the ductile-to-brittle transition temperature in the Charpy impact test did not reach the desired value.

In steel No. 8 of the comparative example, the Si content was lower than the range of the present invention; thus, the yield stress did not reach the desired value.

In steel No. 9 of the comparative example, the Si content was higher than the range of the present invention; thus, the yield ratio and the ductile-to-brittle transition temperature in the Charpy impact test did not reach the desired values.

In steel No. 10 of the comparative example, the Mn content was lower than the range of the present invention; thus, the yield stress did not reach the desired value. In addition, the crystal grains were coarsened, and the average grain size was larger than the range of the present invention; thus, the ductile-to-brittle transition temperature in the Charpy impact test did not reach the desired value.

In steel No. 11 of the comparative example, the Mn content was higher than the range of the present invention; thus, the yield ratio and the ductile-to-brittle transition temperature in the Charpy impact test did not reach the desired values.

In steel No. 12 of the comparative example, the P content was higher than the range of the present invention; thus, the ductile-to-brittle transition temperature in the Charpy impact test did not reach the desired value.

In steel No. 13 of the comparative example, the S content was higher than the range of the present invention; thus, the ductile-to-brittle transition temperature in the Charpy impact test did not reach the desired value.

In steel No. 19 of the comparative example, the heating temperature was higher than the range of the present invention; thus, the average grain size was larger than the range of the present invention. For this reason, the ductile-to-brittle transition temperature in the Charpy impact test did not reach the desired value.

In steel No. 20 of the comparative example, the rough rolling finishing temperature was higher than the range of the present invention; thus, the average grain size was larger than the range of the present invention. For this reason, the ductile-to-brittle transition temperature in the Charpy impact test did not reach the desired value.

In steel No. 21 in the comparative example, the finish rolling start temperature was higher than the range of the present invention; thus, the finish rolling finishing temperature was also higher than the range of the present invention, thereby resulting in the average grain size exceeding the range of the present invention. Consequently, the ductile-to-brittle transition temperature in the Charpy impact test did not reach the desired value.

In steel No. 22 of the comparative example, the average cooling rate was lower than the range of the present invention, resulting in the formation of a large amount of ferrite. In addition, the average grain size was larger than the range of the present invention. Thus, the yield strength and the ductile-to-brittle transition temperature in the Charpy impact test did not reach the desired values.

In steel No. 23 of the comparative example, the cooling stop temperature was higher than the range of the present invention; thus, the coiling temperature was higher than the range of the present invention, resulting in the formation of a large amount of ferrite. In addition, the average grain size was larger than the range of the present invention. Consequently, the yield strength and the ductile-to-brittle transition temperature in the Charpy impact test did not reach the desired values.

In steel No. 24 of the comparative example, the amount of N dissolved was smaller than the range of the present invention; thus, the yield ratio did not reach the desired value.

REFERENCE SIGNS LIST 1 base steel portion
2 welded heat-affected zone
3 melt-solidified portion

The invention claimed is:

1. A hot-rolled steel sheet for an electric resistance welded steel pipe, comprising a chemical composition containing, by mass %:
   C: 0.030% or more and 0.20% or less,
   Si: 0.02% or more and 1.0% or less,
   Mn: 0.40% or more and 3.0% or less,
   P: 0.050% or less,
   S: 0.020% or less,
   N: 0.0070% or more and 0.10% or less, and
   Al: 0.005% or more and 0.080% or less,
      the balance being Fe and incidental impurities,
      wherein N dissolved in a steel is contained in an amount of 0.0010% or more and 0.090% or less, and
      letting a sheet thickness be t, a steel microstructure at a ½t position has an average grain size of 20.0 μm or less.

2. The hot-rolled steel sheet for an electric resistance welded steel pipe according to claim 1, wherein the chemical composition further contains, by mass %, one or two or more selected from:
   Nb: 0.15% or less,
   V: 0.15% or less,
   Ti: 0.050% or less,
   Cu: 1.0% or less,
   Ni: 1.0% or less,
   Cr: 0.20% or less,
   Mo: 0.20% or less,
   Ca: 0.010% or less, and
   B: 0.0050% or less.

3. The hot-rolled steel sheet for an electric resistance welded steel pipe according to claim 1, wherein the steel microstructure at the ½t position contains 90% or more bainite in terms of volume fraction, and
   a remainder contains one or two or more selected from ferrite, pearlite, martensite, and austenite.

4. The hot-rolled steel sheet for an electric resistance welded steel pipe according to claim 2, wherein the steel microstructure at the ½t position contains 90% or more bainite in terms of volume fraction, and
   a remainder contains one or two or more selected from ferrite, pearlite, martensite, and austenite.

5. The hot-rolled steel sheet for an electric resistance welded steel pipe according to claim 1, wherein the sheet thickness is more than 17 mm and 30 mm or less.

6. The hot-rolled steel sheet for an electric resistance welded steel pipe according to claim 2, wherein the sheet thickness is more than 17 mm and 30 mm or less.

7. The hot-rolled steel sheet for an electric resistance welded steel pipe according to claim 3, wherein the sheet thickness is more than 17 mm and 30 mm or less.

8. The hot-rolled steel sheet for an electric resistance welded steel pipe according to claim 4, wherein the sheet thickness is more than 17 mm and 30 mm or less.

9. An electric resistance welded steel pipe comprising a base steel portion and an electric resistance welded portion,
   wherein the base steel portion has a chemical composition containing, by mass %:
   C: 0.030% or more and 0.20% or less,
   Si: 0.02% or more and 1.0% or less,
   Mn: 0.40% or more and 3.0% or less,
   P: 0.050% or less, S: 0.020% or less,
N: 0.0070% or more and 0.10% or less, and
Al: 0.005% or more and 0.080% or less,
the balance being Fe and incidental impurities,
N dissolved in a steel is contained in an amount of 0.0010% or more and 0.090% or less, and
letting a wall thickness of the base steel portion be t, a steel microstructure at a ½t position of the base steel portion has an average grain size of 20.0 μm or less.

10. The electric resistance welded steel pipe according to claim 9, wherein the chemical composition of the base steel portion further contains, by mass %, one or two or more selected from:
Nb: 0.15% or less,
V: 0.15% or less,
Ti: 0.050% or less,
Cu: 1.0% or less,
Ni: 1.0% or less,
Cr: 0.20% or less,
Mo: 0.20% or less,
Ca: 0.010% or less, and
B: 0.0050% or less.

11. The electric resistance welded steel pipe according to claim 9, wherein the steel microstructure at the ½t position of the base steel portion contains 90% or more bainite in terms of volume fraction, and
a remainder contains one or two or more selected from ferrite, pearlite, martensite, and austenite.

12. The electric resistance welded steel pipe according to claim 10, wherein the steel microstructure at the ½t position of the base steel portion contains 90% or more bainite in terms of volume fraction, and
a remainder contains one or two or more selected from ferrite, pearlite, martensite, and austenite.

13. The electric resistance welded steel pipe according to claim 9, wherein the wall thickness of the base steel portion is more than 17 mm and 30 mm or less.

14. The electric resistance welded steel pipe according to claim 10, wherein the wall thickness of the base steel portion is more than 17 mm and 30 mm or less.

15. The electric resistance welded steel pipe according to claim 11, wherein the wall thickness of the base steel portion is more than 17 mm and 30 mm or less.

16. The electric resistance welded steel pipe according to claim 12, wherein the wall thickness of the base steel portion is more than 17 mm and 30 mm or less.

* * * * *